United States Patent [19]

Peterson

[11] Patent Number: 5,245,370
[45] Date of Patent: Sep. 14, 1993

[54] OVERHEAD PROJECTOR FOCUS ARM ADJUSTMENT MECHANISM

[75] Inventor: James E. Peterson, Austin, Tex.

[73] Assignee: Minnesota Mining and Manufacturing Company, St. Paul, Minn.

[21] Appl. No.: 960,562

[22] Filed: Oct. 22, 1992

[51] Int. Cl.⁵ .................................. G03B 21/132
[52] U.S. Cl. .......................... 353/122; 353/DIG. 6; 353/DIG. 3
[58] Field of Search .............. 353/DIG. 6, DIG. 4, 353/DIG. 3, 63, 65, 101, 119, 122

[56] References Cited

U.S. PATENT DOCUMENTS

| | | | |
|---|---|---|---|
| 3,191,491 | 6/1965 | Pignone et al. | 353/DIG. 3 |
| 3,547,530 | 12/1970 | Poole | 353/DIG. 3 |
| 3,711,194 | 1/1973 | Wilson, Jr. | 353/DIG. 3 |
| 4,634,246 | 1/1987 | Dreyer et al. | 353/DIG. 6 |
| 4,795,252 | 1/1989 | Kyhl | 353/DIG. 6 |

Primary Examiner—William A. Cuchlinski, Jr.
Assistant Examiner—William C. Dowling
Attorney, Agent, or Firm—Gary L. Griswold; Walter N. Kirn; David W. Anderson

[57] ABSTRACT

An adjustment mechanism for use with an overhead projector having a post extending upwardly to support a projection head attached to the attachment mechanism incudes a wear pad partially surrounding the post, a friction pad disposed opposite the wear pad with respect to the post and a spring for urging the friction pad into the post.

9 Claims, 4 Drawing Sheets

OVERHEAD PROJECTOR FOCUS ARM ADJUSTMENT MECHANISM

FIELD OF THE INVENTION

The present invention relates generally to transmissive or reflective type overhead projectors and particularly to means for adjusting the position of the projection head of such a projector relative to the base of the projector.

BACKGROUND OF THE INVENTION

Overhead projectors of the transmissive type include a base unit which encloses a light source and lenses for suitably focussing light from the source and a transparent stage upon which may be positioned a transparency or other film having indicia which is to be projected on a distant screen. Above the base is disposed a projection head having lenses and a mirror which function to gather light from the projector base and redirect it to the screen. The projection head is supported by a post extending upwardly from the base. It is necessary that the distance between the projection head and the base be adjustable so that the image projected on the screen may be brought into focus. This is conventionally accomplished by providing a rack gear on the post and a pinion gear attached to an arm which supports the projection head. The pinion gear is turned by means of a handle to move the arm and the attached projection head in the desired direction until the projected image is in focus.

In order to produce and maintain a satisfactory image at the screen it is necessary that the arm supporting the projection head be firmly positioned relative to the base and free of movement in any direction other than perpendicular to the plane of the projector stage. Furthermore, it is necessary that the connection between the projector focus arm and the post be able to compensate for wear between the arm and the post so that alignment and stable support is maintained throughout the life of the projector. On the other hand, the focus arm must be free to move smoothly and without undue force from one vertical position to another.

In the past it has proven difficult to simultaneously achieve all the desirable aspects of the connection between the projector head focus arm and the post extending from the projector base.

SUMMARY OF THE INVENTION

The above-described desirable attributes of the connection between the projection head focus arm and the post extending upwardly from the projector base are provided by an adjustment mechanism having a housing attached to the focus arm and surrounding the post, means for moving the housing along the post with respect to the overhead projector base, a wear pad interposed between the housing and the post, a friction pad disposed to force the post against the wear pad and means for applying a force to the friction pad in a direction toward the wear pad to substantially prevent movement of the housing with respect to the post in any direction perpendicular to the length of the post while permitting movement of the housing along the post toward or away from the overhead projector. It is preferred that the means for moving the housing relative to the post comprise a rack gear attached to the post, a pinion gear within the housing in mesh with the rack gear and attached to a shaft, and a handle attached to the pinion gear shaft for rotating the shaft and thereby the pinion gear in relation to the rack gear for movement of the housing with respect to the post.

It is preferred for stability that the post be square in cross-section and the wear pad be disposed to contact two adjacent sides of the post. In this embodiment, the friction pad is disposed to apply force to the corner of the post opposite the corner between the post sides contacted by the wear pad. It is also preferred for smooth movement that the wear pad and friction pad be formed of a polymeric material and that the friction pad be urged toward the wear pad by a spring so that the mechanism will remain stable despite wear to the pads.

BRIEF DESCRIPTION OF THE DRAWINGS

The present invention will be more completely described with respect to the accompanying drawings, wherein like numbers refer to like parts in the several views, and wherein.

DESCRIPTION OF THE PREFERRED EMBODIMENTS

Figure 1:
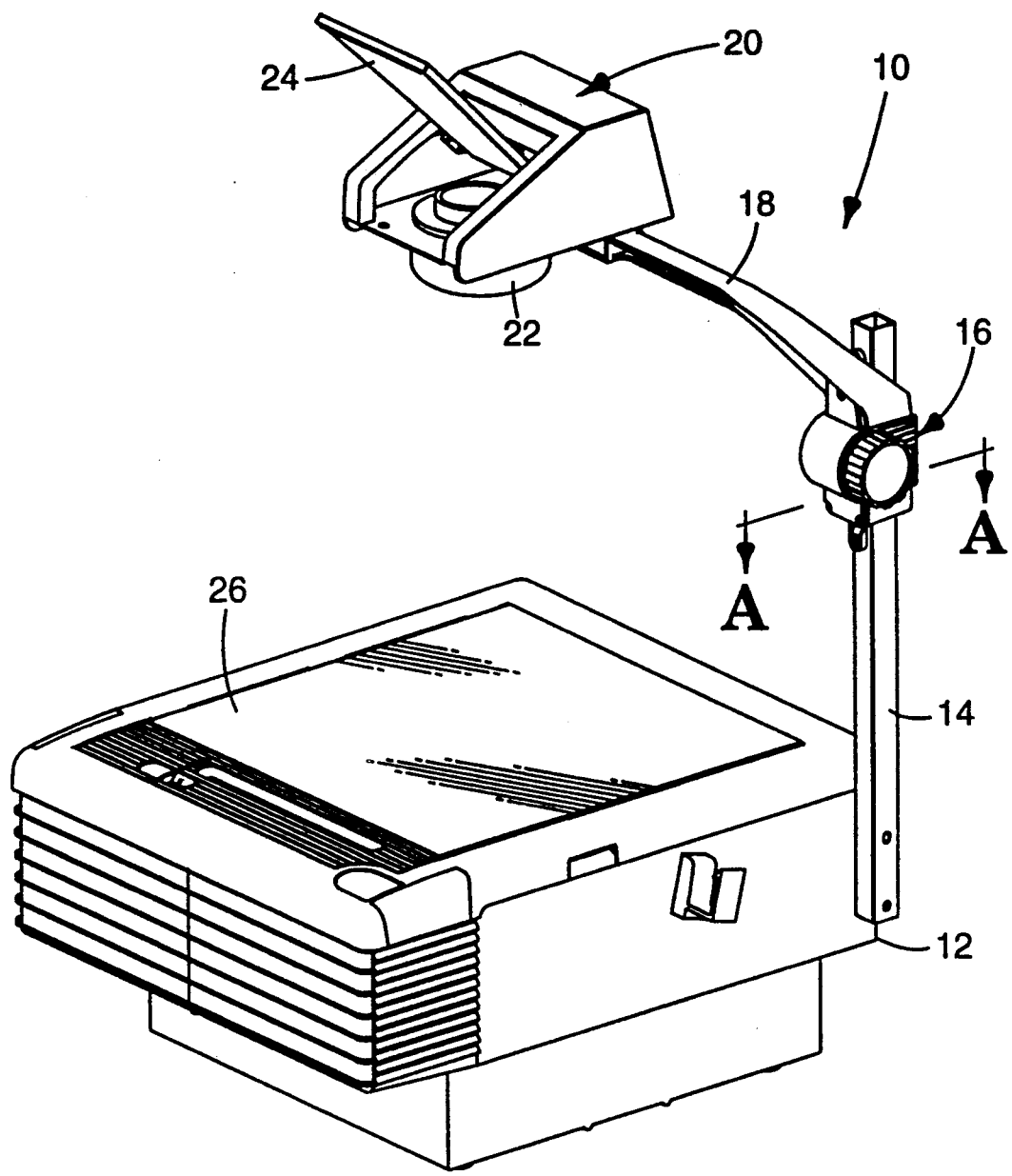
FIG. 1 is a perspective view of a transmissive overhead projector which includes the focus arm adjustment mechanism of the present invention.

FIG. 1 illustrates a transmissive type overhead projector, generally indicated as 10, which includes as major elements a base 12, an upright post 14 extending from the base 12, an adjustment mechanism 16 of the present invention attached to the post 14 and a focus arm 18 extending from the adjustment mechanism 16 to support a projection head 20. The projection head 20 includes a lens or plurality of lenses 22 and a mirror 24 and is supported so that the lens 22 is centered over a transparent stage 26.

The base 12 of the projector 10 houses a light source, mirrors and lenses which direct light through the stage 26 and an imaging film such as a transparency located thereon and focus that light at the lens 22 of the projection head 20. The light passing through the projection head lens 22 is redirected by the mirror 24 to a distant vertical surface which is or serves as a screen for the projected image. Because the distance from the projector 10 to the screen may vary, it is necessary that the projection head 20 be movable relative to the base 12 of the projector 10 so that proper focussing of the projected image at the screen may be achieved. The adjustment mechanism 16 is provided so that this change in height of the projection head 20 above the projector base 12 may be easily accomplished.

It will be recognized that a number of disparate requirements of the adjustment mechanism 16 are necessary for convenient operation. The adjustment mechanism 16 must maintain the projection head 20 firmly in position above the base 12 so that the projection head lens 22 is always centered over the stage 26 and the lens 22 must be maintained parallel to the stage 26. The focus arm 18 must be maintained in the desired position above the stage 26 without unintentional movement, but the focus arm must be able to be easily repositioned. Finally, the adjustment mechanism 16 must accomplish these requirements for the life of the projector 10 and so must compensate for the wear caused by repeated up-and-down movements of the focus arm 18 relative to the post 14.

Figure 2:
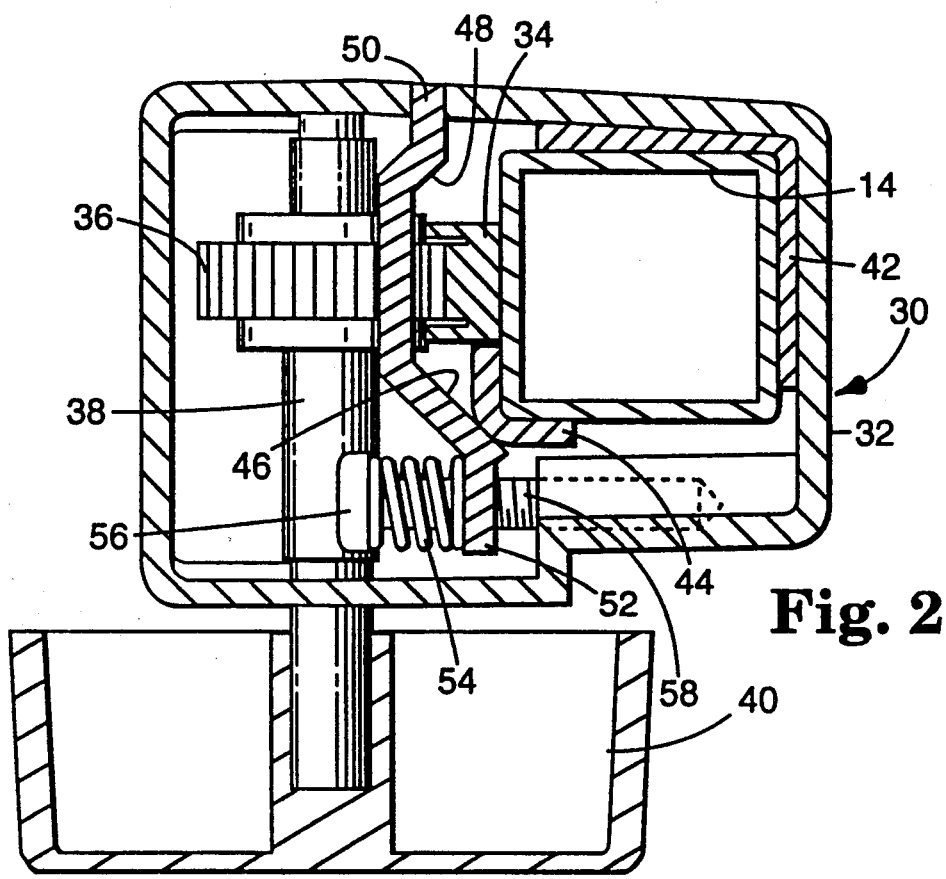
FIG. 2 is a cross-sectional view of one embodiment of the focus arm adjustment mechanism taken generally along the line A—A of FIG. 1.

FIG. 2 illustrates one embodiment 30 of the adjustment mechanism. FIG. 2 is a cross-sectional view approximately through the center of the adjustment mechanism 30 along the line A—A of FIG. 1. The adjustment mechanism 30 includes a housing 32 surrounding the post 14 and located at a rack gear 34 attached to the post 14. In mesh with the rack gear 34 is a pinion gear 36 connected to a shaft 38 which is rotatably mounted in and extends through the housing 32. The shaft 38 terminates in a handle 40 which may be rotated to rotate the pinion gear 36 and cause the adjustment mechanism 30 to move relative to the rack gear 34 and thus the post 14 and the projector base 12. In order to maintain the adjustment mechanism 30 and the focus arm 18 in precise alignment with the post 14, the adjustment mechanism 30 is provided with a wear pad 42 disposed between the housing 32 and the post 14. It is preferred that the wear pad 42 contact substantially the entire extent of two adjacent faces of the post 14 and that the wear pad 42 be manufactured of a material which will allow the adjustment mechanism 30 to be relatively easily moved with respect to the post 14. Such a material is a polymeric material such as acetal resins, polymeric amides or tetrafluoroethylene. At the corner opposite the wear pad 42 is a friction pad 44 which is provided to force the post 14 into contact with the wear pad 42. The friction pad 44 is forced against the post 14 by a pressure piece 46 which is an extension of a arm 48 pivotally attached to the housing 32 at one end 50. The free end 52 of the arm 48 located opposite the end 50 attached to the housing 32 is engaged by a spring 54 which is compressed against the free end 52 of the arm 48 by the enlarged head 56 of a fastener 58 threaded to the housing 32. Although the fastener 58 is illustrated as being a bolt, different conventional fasteners could be used.

The spring 54 is compressed to a predetermined degree to force the pressure piece 46 into the friction pad 44, and thus the post 14 into the wear pad 42 with a desired force sufficient to prevent movement of the adjustment mechanism 30 in any direction perpendicular to the length of the post 14 and unwanted movement of the adjustment mechanism along the length of the post 14. Since the pressure piece 46 is urged toward the friction pad 44 by a spring 54, wear of the wear pad 42 and the friction pad 44 will be absorbed by elongation of the spring 54.

Figure 3:
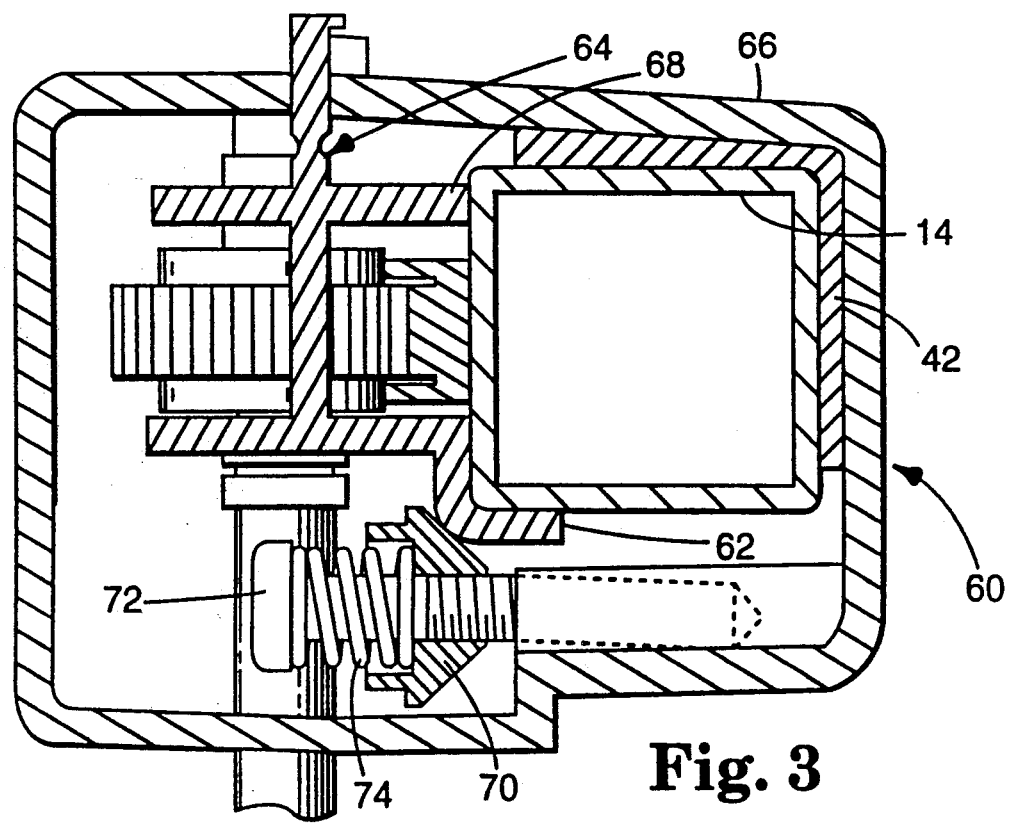
FIG. 3 is a cross-sectional view of a second embodiment of the focus arm adjustment mechanism taken generally along the line A—A of FIG. 1.

FIG. 3 illustrates another embodiment of an adjustment mechanism 60 which is substantially identical to the adjustment mechanism 30 of FIG. 2 except the friction pad 62 is formed as a part of a molded piece 64 which locates the friction pad 62 with respect to the housing 66 and provides a second contact pad 68 to further stabilize the adjustment mechanism 60 with respect to the post 14. The application of force to the friction pad 62 in the embodiment of FIG. 3 is accomplished by means of a collar 70 which surrounds the fastener 72 and is free to move axially relative to the fastener 72. A spring 74 between the collar and the fastener 72 operates as described above to maintain a substantially constant force on the friction pad 62 despite wear of the parts comprising the adjustment mechanism 60.

Figure 4:
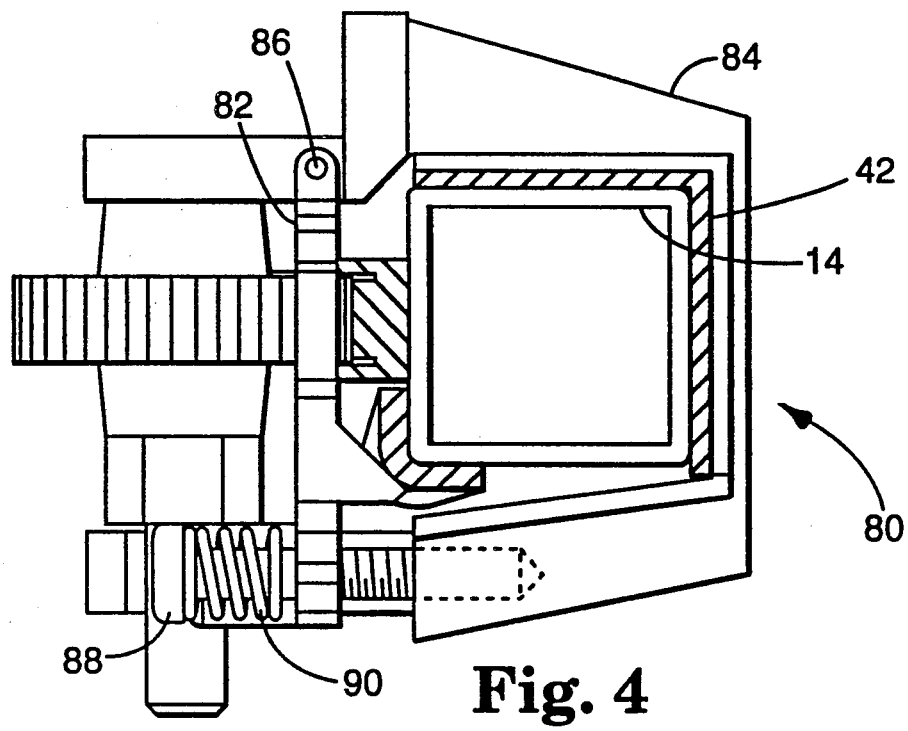
FIG. 4 is a cross-sectional view of a third embodiment of the focus arm adjustment mechanism taken generally along the line A—A of FIG. 1.

FIG. 4 illustrates an embodiment of an adjustment mechanism 80 which is different from the embodiment of FIG. 2 only in that the arm 82 is pivotally attached to the housing 84 by a pin 86.

Figure 5:
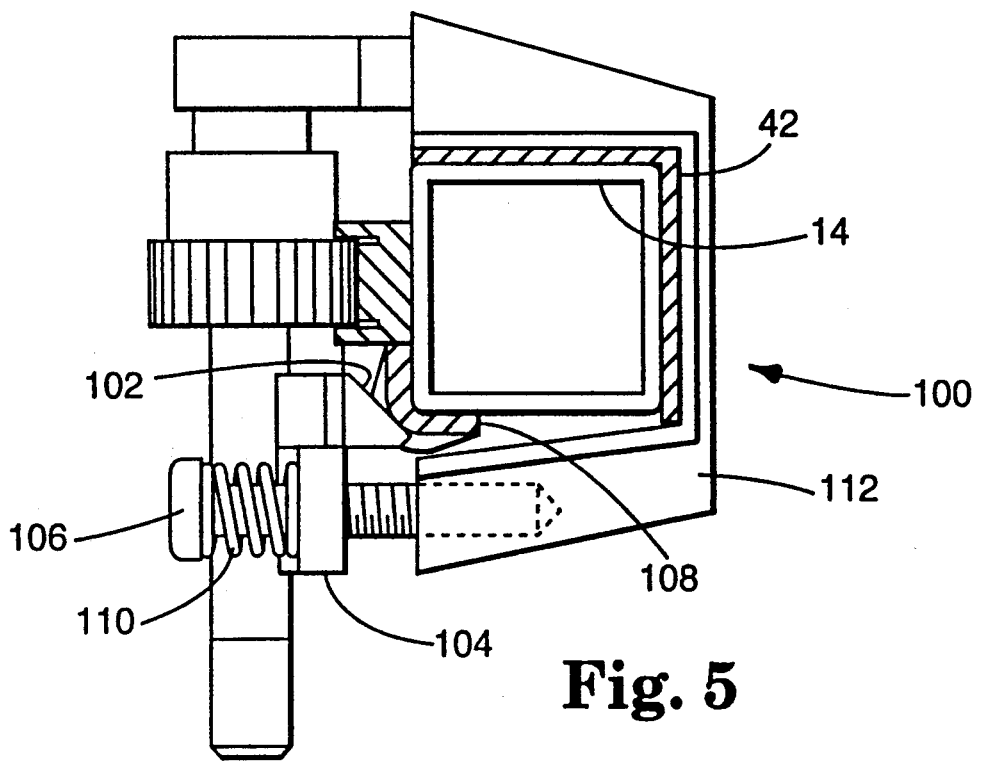
FIG. 5 is a cross-sectional view of a fourth embodiment of the focus arm adjustment mechanism taken generally along the line A—A of FIG. 1.
Figure 6:
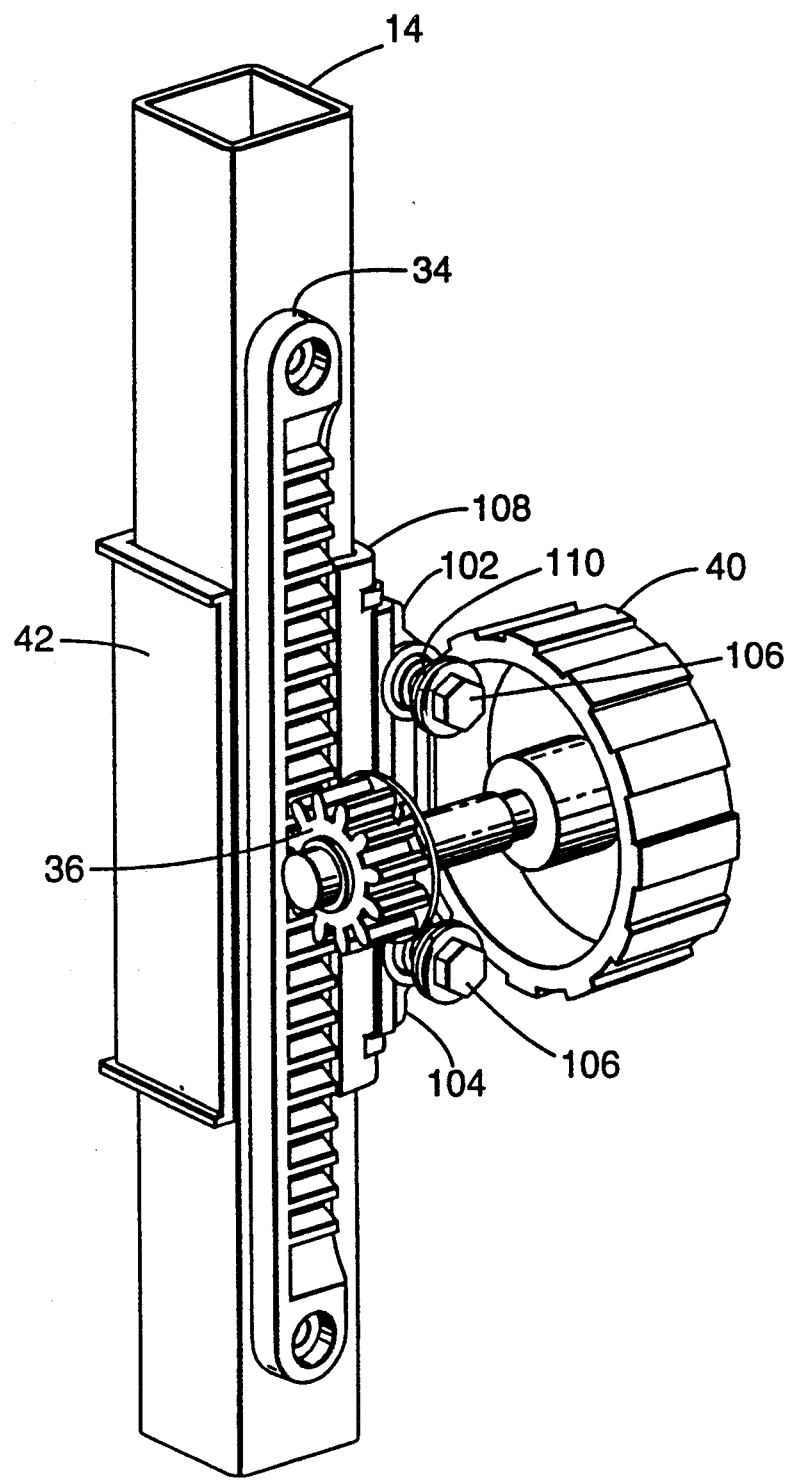
FIG. 6 is a perspective view of a portion of the overhead projector and internal parts of the adjustment mechanism of the embodiment of FIG. 5. Portions of the adjustment mechanism have been removed for clarity.

FIGS. 5 and 6 illustrate a final embodiment of an adjustment mechanism 100 wherein the pressure piece 102 is a part of a short arm 104 extending only to the fastener 106. The arm 104 surrounds the fastener 106 and can slide in the direction of the friction pad 108 as urged by the spring 110. FIG. 6 illustrates that the wear pads, friction pads and arms which provide the pressure pieces for the friction pads may and preferably extend substantially the entire length of the adjustment mechanisms for stability. Thus the arms may have a considerable third dimension into the plane of FIGS. 2–5 and so may better be described as plates. It is therefore possible, and probably preferred form a stability standpoint to attach the arms to the housings at more than one point and to provide more than one fastener and spring to force the friction pad against the post. For example in FIG. 6, the arm 104 may be additionally attached to the housing 112 by another fastener 106 at the opposite edge of the arm 104.

Thus there has been described an attachment mechanism for an overhead projector which maintains the projection head in alignment and compensates for wear while permitting desired movement of the projection head with respect to the base of the projector. Although many embodiments of the invention have been described, numerous variations will be apparent to the those skilled in the art. For example, the invention has been described with respect to a projector having a square post. The post could have many other cross-sectional shapes, including cylindrical, if the adjustment mechanism were keyed to the post. Also, the invention has only been described with respect to a transmissive type overhead projector. The invention is completely applicable to reflective type overhead projectors also.

I claim:

1. An adjustment mechanism for an overhead projector having a base, an upright post extending from the base, a projection head and a focus arm connecting the projection head to the post, the adjustment mechanism being operable to move the focus arm and the projection head along the post toward or away from the overhead projector base to provide focus adjustment and comprising:

a housing attached to the focus arm and surrounding the post;

means for moving said housing along the post with respect to the overhead projector base;

a wear pad interposed between said housing and the post;

a friction pad disposed to force the post against said wear pad; and means for applying a force to said friction pad in a direction toward said wear pad to substantially prevent movement of said housing with respect to the post in any direction with respect to the post while permitting movement of said housing along the post toward or away from the overhead projector.

2. An adjustment mechanism for an overhead projector according to claim 1 wherein said means for moving the housing relative to the post comprises:
- a rack gear attached to the post;
- a pinion gear within said housing in mesh with said rack gear and attached to a shaft;
- a handle attached to said pinion gear shaft for rotating said shaft and thereby said pinion gear in relation to said rack gear for movement of said housing with respect to the post.

3. An adjustment mechanism for an overhead projector according to claim 1 wherein the post is square in cross-section, said wear pad is disposed to contact two adjacent sides of the post and said friction pad is disposed to apply force to the corner of the post opposite the corner between the post sides contacted by said wear pad.

4. An adjustment mechanism for an overhead projector according to claim 3 wherein said wear pad and said friction pad are manufactured of polymeric materials.

5. An adjustment mechanism for an overhead projector according to claim 3 wherein said force is applied to said friction pad by a pressure piece which is forced against said friction pad by a spring attached to said housing.

6. An adjustment mechanism for an overhead projector according to claim 5 wherein said pressure piece is an extension of an arm pivotally attached to said housing whereby said pressure piece is free to move toward and away from said friction pad.

7. An adjustment mechanism for an overhead projector according to claim 6 wherein said spring bears against said arm to force said pressure piece toward the post and is attached to said housing by a fastener attached to said housing.

8. An adjustment mechanism for an overhead projector according to claim 5 wherein said spring is attached to said housing by a fastener attached to said housing.

9. An adjustment mechanism for an overhead projector according to claim 8 wherein said fastener includes an enlarged head, said pressure piece is a collar surrounding said fastener and said spring is disposed between said head and said collar.

* * * * *